US005259709A

United States Patent [19]
Hunt

[11] Patent Number: 5,259,709
[45] Date of Patent: * Nov. 9, 1993

[54] GROOVING OR THREADING TOOL

[75] Inventor: Carl E. Hunt, Davisburg, Mich.

[73] Assignee: Valenite

[*] Notice: The portion of the term of this patent subsequent to Dec. 25, 2007 has been disclaimed.

[21] Appl. No.: 690,244

[22] Filed: Apr. 24, 1991

Related U.S. Application Data

[63] Continuation of Ser. No. 488,474, Feb. 26, 1990, abandoned, which is a continuation of Ser. No. 261,309, Oct. 24, 1988, abandoned.

[51] Int. Cl.⁵ .............................................. B23B 27/00
[52] U.S. Cl. ...................................... 409/234; 279/8; 408/233; 408/238
[58] Field of Search ............... 408/233, 144, 199, 200, 408/231, 238, 239 R, 239 A; 279/8; 409/234

[56] References Cited

U.S. PATENT DOCUMENTS

| 804,602 | 11/1905 | Howk | 408/233 |
|---|---|---|---|
| 930,436 | 8/1909 | Thomas | 408/233 |
| 1,285,869 | 11/1918 | Wineman | 408/233 |
| 3,164,041 | 1/1965 | Carlstedt | 408/713 |
| 3,250,154 | 5/1966 | Breuning | 408/199 |
| 4,871,286 | 10/1989 | Hunt | 408/144 |
| 4,979,851 | 12/1990 | Hunt | 408/233 |
| 4,998,851 | 3/1991 | Hunt | 408/233 |

Primary Examiner—Daniel W. Howell
Attorney, Agent, or Firm—Bill C. Panagos

[57] ABSTRACT

An elongated grooving or threading tool has a cutting section and a rearward cemented carbide section which are held together in axial alignment by a drawbolt which extends through an axially aligned bore in the cutting section and engages the respective sections to hold the connection under compression.

5 Claims, 2 Drawing Sheets

GROOVING OR THREADING TOOL

This is a continuation of copending application Ser. No. 07/488,474 filed on Feb. 26, 1990, now abandoned, which is a continuation of 07/261,309, filed Oct. 24, 1988, now abandoned.

CROSS REFERENCE TO RELATED APPLICATIONS

Copending application, U.S. Ser. No. 07/132,086, now abandoned, filed Dec. 11, 1987, entitled VIBRATION DAMPENED BORING BAR, by C. E. Hunt, relates to cantilever tools having a structure for dampening vibrations, and two additional applications both entitled Grooving or Threading Tool, by C. E. Hunt, having Ser. Nos. 07/261,194 and 07/262,762, both now abandoned, are filed concurrently herewith.

FIELD OF INVENTION

The present invention relates to grooving or threading tools of the type having a longitudinal axis and a radially projecting cutting edge for grooving or threading applications.

BACKGROUND OF THE INVENTION

To accurately groove or thread small diameter cylindrical parts such as bars, tubes or pipes on either the inside or outside, it is often desirable to utilize an elongated tool. Such tools typically have a radially projecting cutting edge corresponding to the desired size of the groove or thread. Generally the part being grooved or threaded is rotated and, even axially moved for threading applications, while the cutting edge removes material. However, such tools may be rotated along the longitudinal axis for some cutting applications.

For some applications it is desirable to use a tool with a all diameter, so the tool can easily fit into the interior of a small diameter cylindrical opening. Due to the demands of industry for increased accuracy, it is desirable that the tool retain its rigidity and dimensional accuracy even when threading openings that extend deeply into the material being grooved or threaded. Due to the demands of industry for increased efficiency, it is desirable that the tool retain its sharpness and be capable of multiple operations for various sizes of grooves and threads. The present practice of resharpening and reshaping tools is time consuming and hence uneconomical.

The present invention concerns the production of an optimized grooving or threading tool constructed of materials which contribute to prolong tool life and are structurally combined in such a manner so as to permit grooving or threading with enhanced dimensional accuracy.

SUMMARY OF THE INVENTION

It is an object of the present invention to provide a grooving or threading tool with increased rigidity at the cutting section for enhancing the accuracy of machining operations.

It is an object of the present invention to provide a grooving or threading tool in which damaged parts can be readily disassembled and replaced.

It is a further object of the present invention to select materials which provide prolonged life and enhanced dimensional accuracy for a grooving or threading tool.

It is an object of the present invention to provide a grooving or threading tool utilizing a combination of different materials having an improved connection therebetween.

It is an object of the present invention to increase the stiffness of the joint at the transition of the different materials being utilized.

It is an object of the present invention to provide for a selection of materials in combination with a joint configuration which results in minimizing the transition of the flexure characteristics along the axial length of the grooving or threading tool.

Additional and further objects of the present invention will become apparent from reading the following description of the present invention.

In accordance with the present invention, there is provided an elongated grooving or threading tool of the type having a radially projecting cutting edge. The tool comprises a cutting section having an axially extending bore and a radially projecting cutting edge, and a hollow cylindrically shaped cemented carbide section. A drawbar which is connected between the cutting section and the cemented carbide section holds these sections in axial alignment along the central axis. It is also contemplated that the connections are configured in such a manner that an intermediate section may be positioned between the cemented carbide section and the cutting section as a spacer. The drawbar, which is under tension, holds the respective sections and the respective joints between the sections under compression for increasing the stiffness of the tool at the joints. The drawbar includes means for centering said drawbar relative to the rearward section for preventing relative radial movement between the forward end of the drawbar and the rearward cemented carbide section.

When an intermediate section is not utilized, the cemented carbide section forms a connection directly with the cutting section. In either case, i.e., with or without the intermediate section, each connection comprises a key and a keyway and additionally a pair of first and second surfaces. The first surfaces and second surfaces respectively, extend on either side of the respective key or keyway and lie substantially within a plane perpendicular to the axis of rotation. The first surfaces are adapted to mate with the second surfaces for maintained axial alignment of the respective sections and along the axis of rotation and increasing the stiffness of the joint.

The connection has a specific configuration adapted for joining the hollow cemented carbide section and the cutting section. In addition to comprising a drawbar for holding the respective sections under compression for increasing the stiffness of the tool at the joints, the connection includes a key and a keyway and an additional pair of mating surfaces as set forth above. Preferably, the first and second surfaces of the respective cutting section or the cemented carbide section comprise a major portion of the cross-sectional area of the respective section.

DESCRIPTION OF PREFERRED EMBODIMENT

Figure 1:
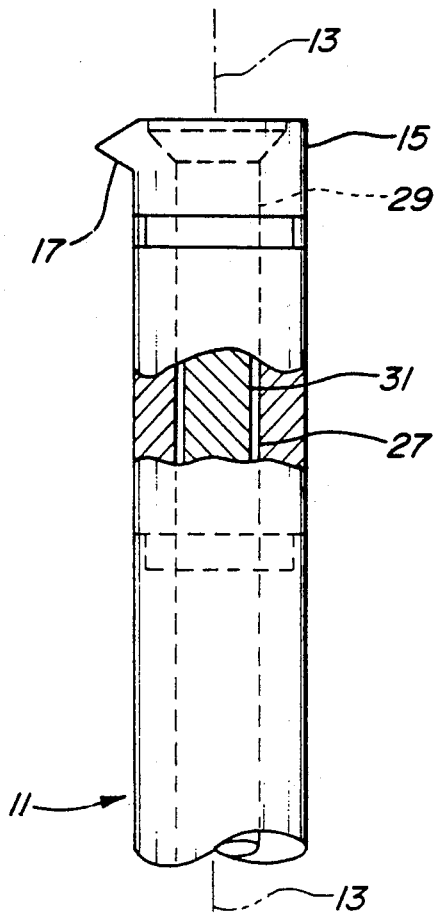
FIG. 1 is a plan view of the grooving or threading tool showing a portion in section.
Figure 1:
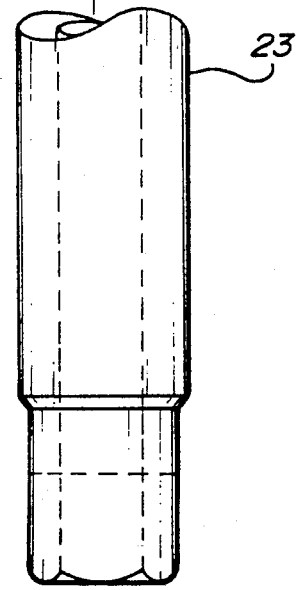
Figure 4:
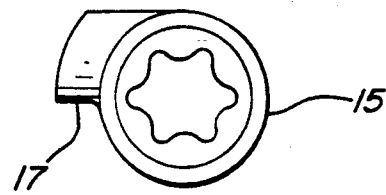
FIG. 4 is a end view of the cutting section showing FIG. 3.

The embodiment of this invention as set forth in the drawings is particularly suited for achieving the objects of this invention. FIG. 1 depicts a cylindrically shaped grooving or threading tool having a central longitudinal axis. If the grooving or threading tool 11 is rotated so to cut the work, the longitudinal axis 13 is parallel to or coincides with the axis of rotation. In case the work is rotated, the longitudinal axis 13 is parallel to or coincides with the central axis of the part or bore being cut. A forwardly projecting cutting section 15 has a radially projecting cutting edge 17 adapted to be driven into the work being cut for grooving or threading purposes. The rearward section 23 is a cemented tungsten carbide body which may have a longitudinally extending flat section 25 on the outer periphery for engaging a holding mechanism for securing the grooving or threading tool 11 during a cutting operation. In the case where the workpiece is turned and the grooving or threading tool 11 remains stationary, the flat section 25 permits holding the grooving or threading tool 11 in a stationary position.

Figure 3:
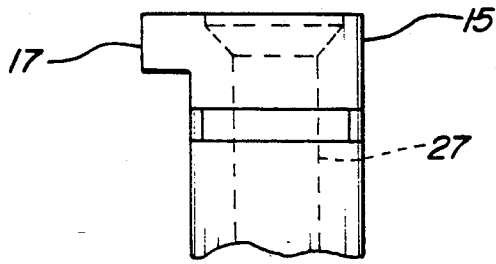
FIG. 3 is a plan view of the cutting section.

As illustrated in FIGS. 1 to 4, the configuration of the cutting section 15 is shown. The forwardly projecting cutting section 15 is preferably made of a hard cutting tool material such as cemented carbide or hardened steel. The cutting section 15 includes a radially projecting cutting edge 17 having the shape of the desired thread or groove. If a thread is being cut, the cutting edge or surface 17 has a pointed configuration as shown in FIG. 1. If a rectangular groove is being cut, the cutting edge 17 has a rectangular configuration as shown in FIG. 3. The edge 17 is displaced from the longitudinal axis 13 or the peripheral surface of the generally cylindrically shaped cutting section 15 a sufficient distance to give the proper depth of cut. The area behind the cutting edge 17 blends into the cylindrically portion of the transversely extending slot having a rectangular cross-section. The transverse axis of the slot is in alignment with a diameter passing through the axis of the grooving or threading tool 11. The keyway associated with the cutting section 15 at connection 35 is similarly configured. The keyway 43 has a flat bottom wall 49 with planar side walls 51 extending outwardly therefrom. Each of the respective side walls 51 join a respective one of the second surfaces 47. Each of the second surfaces 47 extend laterally outwardly from the keyway 43.

Figure 8:
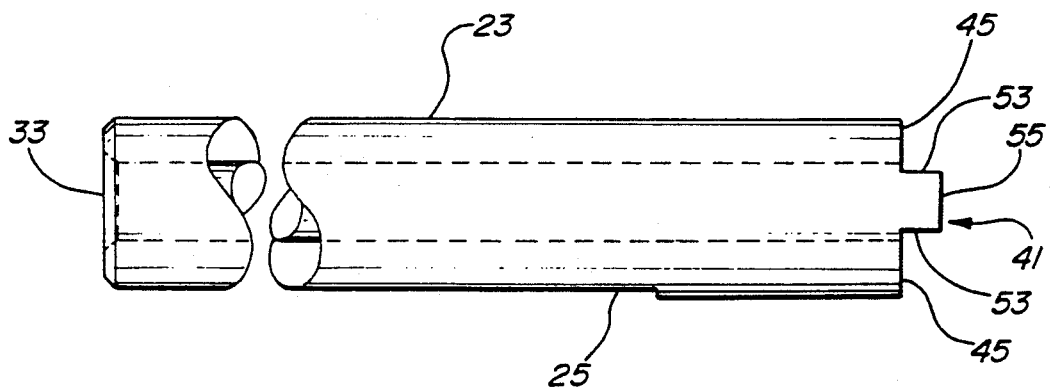
FIG. 8 is a side elevational view of the cemented carbide section.
Figure 5:
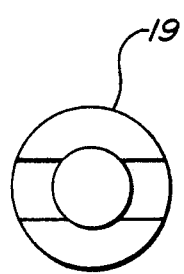
FIG. 5 is an end view of the intermediate section.
Figures 6, 7:
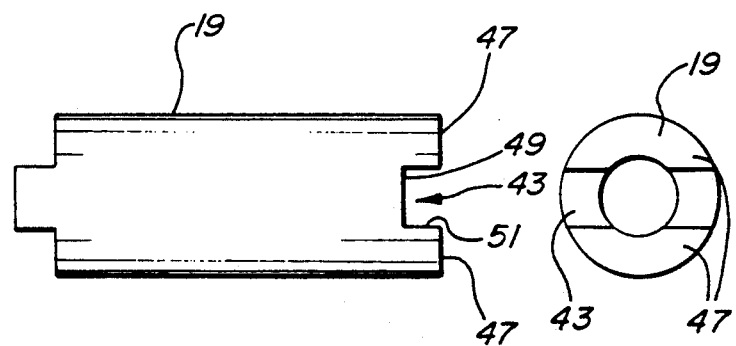
FIG. 6 is a rear view of the intermediate section.
FIG. 7 is a side elevational view of the intermediate section.

FIG. 8 shows details of the configuration of key 41. The key 41 has a configuration matching the keyway 45. Sides 53 extend diametrically across and project outwardly from the end of a respective section. The sides 53 are joined by planar top wall 55 which matches the bottom wall 49. When the key 41 is inserted into the keyway 43, the sides 53 of the key 41 are closely adjacent the sidewalls 51 of the keyway 43, so that torque from turning the grooving and threading tool 11 is transmitted from one section to the other. The close fit between the key 41 and keyway 43 aids in obtaining the proper axial alignment between respective sections 15, 19, 23. The top wall 55 of the key 41 is preferably spaced from the bottom wall 49 of the keyway 43, so that the compressive forces are borne by the first and second surfaces.

As shown in the partial sectional view of FIG. 1, the drawbar 31 has an enlarged portion 61 closely adjacent the rearward section 23. The partial section of FIG. 1 shows the enlarged portion 61 and its relationship with the cylindrical recess of the rearward section 23 as exaggerated to show the details of a sliding precision fit between the drawbar 31 and the rearward section 23. The drawbar 31 is thusly provided with a means for centering the drawbar 31 relative to the rearward section 23 to prevent relative radial movement between an end of the drawbar 31 and the rearward section 23. According to a most preferred sliding precision fit, the tolerance of the inside diameter of the rearward section 23 is held at a total tolerance of less than ten ten thousandths of an inch, and preferably at a total tolerance of less than five ten thousandths of an inch. The drawbar 31 which is of a steel construction is also held to a similar total tolerance. The above description of the sliding precision fit is not intended to limit the present invention since it is believed that greater tolerances may be used for the respective exterior precision surfaces on the exterior of the drawbar 31 and the interior of the rearward section 23.

Also, according to a preferred embodiment of the present invention, the enlarged portion 61 extends rearwardly along the axial direction from the junction of the rearward section 23 a distance sufficient to impart enhanced stiffness to the tool 11. To a certain extent, the preferred rearward extent of the enlarged portion 61 depends on the diameter of the drawbar 31 and the diameter of the cylindrical recess in the rearward section 23 with larger diameters requiring a greater rearward extension of the enlarged portion 61 to result in a proportionally enhanced stiffening effect. Preferably the enlarged portion 61 extends rearwardly a distance along the axis of the drawbar 31 a distance of from about one to about four diameters. The diameter can be either the inside diameter of the cylindrical recess or the outside diameter of the drawbar 31 since both are essentially identical in the area of the sliding precision fit.

Figure 2:
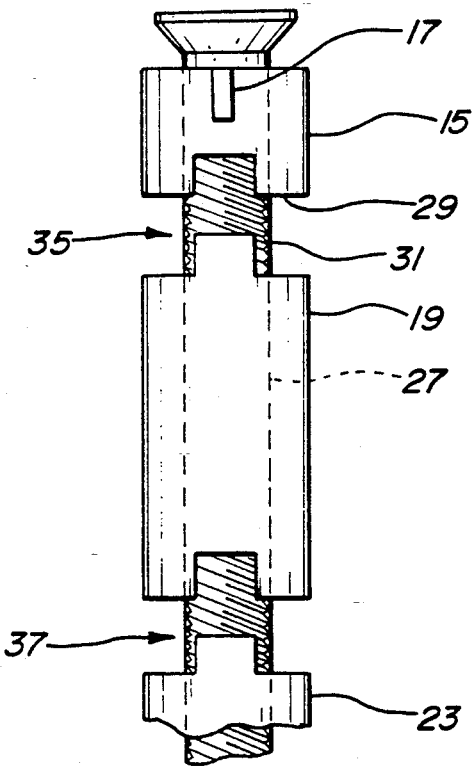
FIG. 2 is a side elevational view showing the connections between the intermediate section and the respective cutting section and cemented carbide section of FIG. 1.
Figure 9:
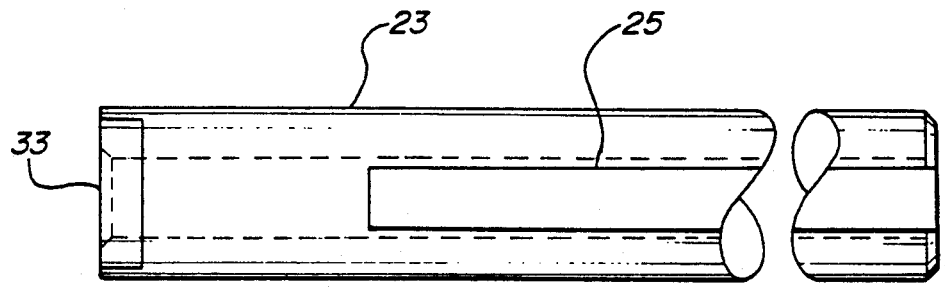
FIG. 9 is a plan view of the cemented carbide section shown in FIG. 8.

In an embodiment as shown in FIG. 2, the respective first surfaces 45 and respective second surfaces 47 comprise a major portion of the cross-sectional area of the grooving or threading tool. The connection between the cutting section 15 and cemented carbide section 23 is shown at 65. The relatively large cross-sectional area of the surfaces 45 and 47 of the respective cutting section 15 and cemented carbide section 23 are in direct mating relationship and bear the compressive force created by the drawbar. Thus, a structure of increased rigidity is provided due to the use of a drawbar and large area of the mating surfaces.

I claim:

1. An elongated grooving and threading tool of the type having a longitudinal axis and radially projecting cutting edge, said tool comprising a cutting section having an axially extending bore and a radially projecting cutting edge, an other section, said other section comprising a hollow cylindrically shaped cemented carbide section, a connection formed at the juncture of said cutting section and said other section, said connection comprising a transversely positioned key and a keyway, said other section being provided with said keyway, said connection including a pair of first and second surfaces, said first surfaces and said second surfaces, respectively, extending on either side of said respective key and said keyway substantially within a plane perpendicular to said axis of rotation, said first surfaces being adapted to mate with said second surfaces to align said cutting section and said other section along the longitudinal axis, and said first surfaces and said second surfaces, respectively, comprising a major portion of the cross-sectional area of said tool, a drawbar connected between said cutting section and said other section for holding said sections in axial alignment along said axis, said drawbar including a cylindrically shaped enlarged means for centering said drawbar relative to said other section for preventing relative radial movement between said cutting section and said other section while permitting axial movement therebetween whereby the tolerance of the inside diameter of said other section is held at a total tolerance of less than about ten ten thousandths of an inch, said drawbar being under tension for holding said connection under a compressive force, said drawbar including a nut for securing said drawbar to the rearward portion of said other section.

2. An elongated grooving or threading tool having a longitudinal axis comprising a cutting section having an axially extending bore and a radially extending cutting edge and a hollow cylindrically shaped cemented carbide section, a connection being formed at the juncture of said cutting section and said cemented carbide section, a drawbar connected between said cutting section and said cemented carbide section for holding said sections in axial alignment along the longitudinal axis and holding said connection under compression for increasing the stiffness of the tool, said drawbar extending entirely through said axially extending bore, said connection comprising a transversely positioned key one of said sections and a transversely positioned keyway being provided on said other of said sections, said connection including a pair of first and second surfaces, said first surfaces and said second surfaces, respectively, extending on either side of said respective key and said keyway substantially within a plane perpendicular to said axis of rotation, said first surfaces being adapted to mate with said second surfaces to align said cutting section and said cemented carbide section along the longitudinal axis, and said first surfaces and said second surfaces, respectively, comprising a major portion of the cross-sectional area of said boring tool.

3. An elongated grooving or threading tool according to claim 2 wherein said draw bar includes an enlarged end for engaging said cutting section.

4. An elongated grooving or threading tool according to claim 3 wherein said drawbar includes a nut for securing said drawbar to the rearward section.

5. An elongated grooving and threading tool according to claim 1 wherein whereby the tolerance of the inside diameter of said other section is held at a total tolerance of less than about five ten thousandths of an inch.

* * * * *